(No Model.) 2 Sheets—Sheet 1.
H. FRIEDERICHS & C. PHILIPPI.
METHOD OF DISINTEGRATING RAGS, &c.
No. 303,719. Patented Aug. 19, 1884.
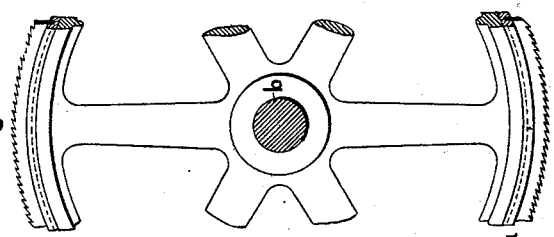
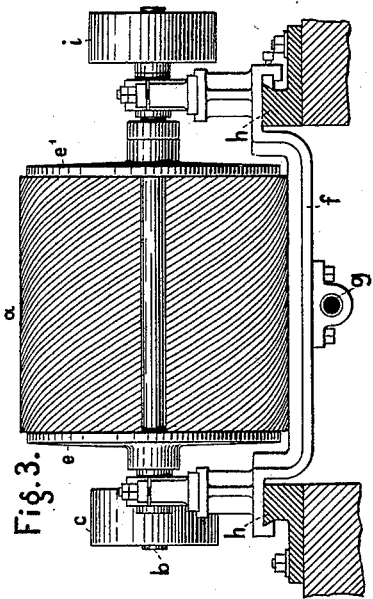
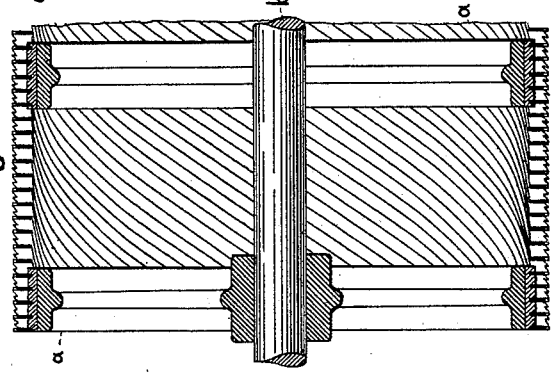
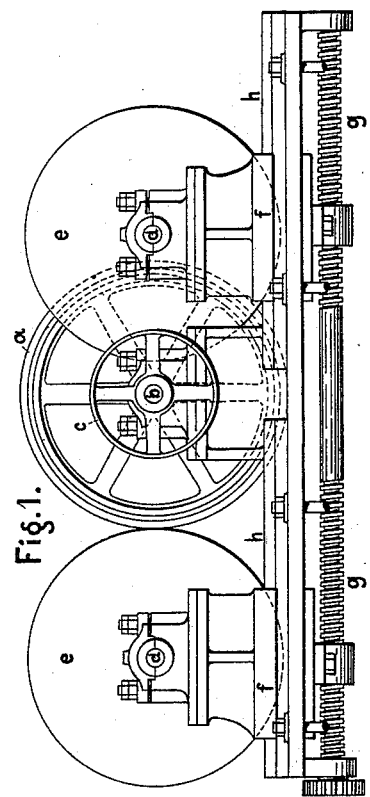
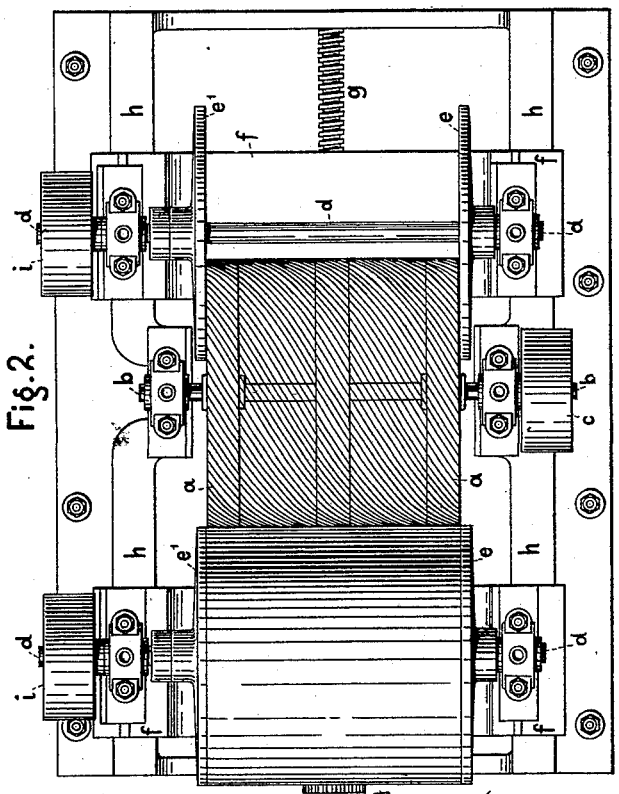
Witnesses:
C. A. Dick
D. P. Doring
Inventors:
Harry Friederichs &
Christian Philippi
by M. Bailey atty.
N. PETERS. Photo-Lithographer. Washington, D. C.

(No Model.) 2 Sheets—Sheet 2.

H. FRIEDERICHS & C. PHILIPPI.
METHOD OF DISINTEGRATING RAGS, &c.

No. 303,719. Patented Aug. 19, 1884.

UNITED STATES PATENT OFFICE.

HARRY FRIEDERICHS AND CHRISTIAN PHILIPPI, OF HAINHOLZ, NEAR HANOVER, PRUSSIA, GERMANY.

METHOD OF DISINTEGRATING RAGS, &c.

SPECIFICATION forming part of Letters Patent No. 303,719, dated August 19, 1884.

Application filed August 1, 1883. (No model.)

*To all whom it may concern:*

Be it known that we, HARRY FRIEDERICHS and CHRISTIAN PHILIPPI, both residing at Hainholz, near Hanover, Kingdom of Prussia, German Empire, have invented a new and useful Method of Disintegrating Rags and other Fibrous Material, and Machine to be Used Therefor, of which the following is a specification.

Our invention relates to the disintegration of rags and other fibrous material for the purpose of obtaining therefrom a product (or stuff) adapted for the manufacture of paper, cardboard, &c.; and it substantially consists in compressing the said material into a compact mass or body, forming a solid of revolution, and thereupon subjecting the same while being rotated to the action of rapidly-rotating serrated cutters. By preference, the material to be reduced is made up in the form of a cylinder. For this purpose a shaft having a disk fixed thereon and adapted to carry another disk opposite to the former is placed centrally into a cylindrical drum. Rags, old cordage, or other like materials are then put into the said drum round about the shaft, the removable disk is placed on the same, and power is applied to compress the material. Finally the removable disk is secured to the shaft. The shaft, with the body of rags, &c., upon it, is then taken out of the drum and placed into the bearings provided therefor on the frame of the disintegrating-machine. Motion having been imparted to the cutters as well as to the body of rags, the latter is slowly forced forward against the former (or vice versa) by the medium of a screw or otherwise, while a current of air created by a fan or other appliance draws the disintegrated fibers away from the machine and delivers them into a suitable receptacle. By means of appropriate arrangements combined with the conduit leading from the machine to the said receptacle, the fibers may be separated according to their different degree of fineness.

On the annexed two sheets of drawings a machine and a compressing apparatus adapted for carrying out the described process are represented.

Figure 6:
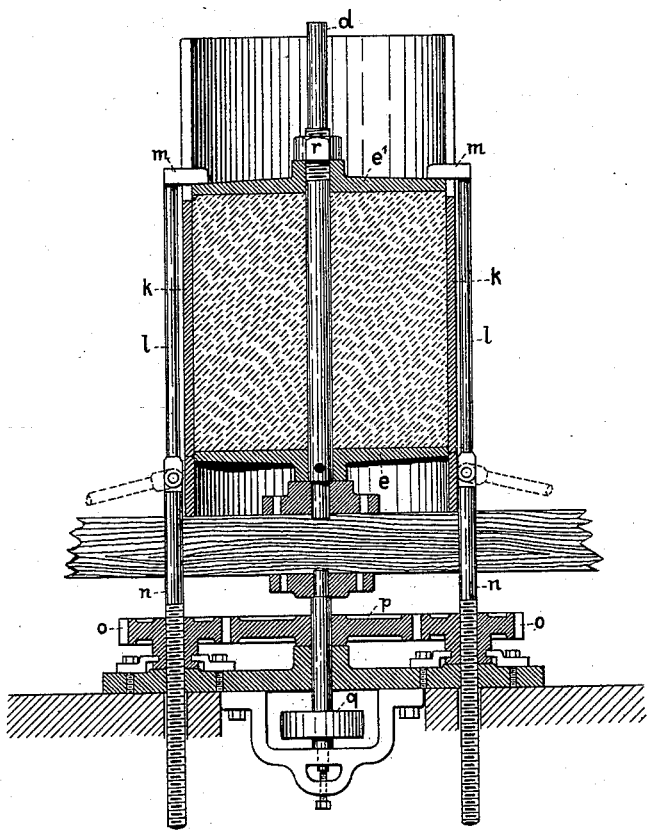
Figure 7:
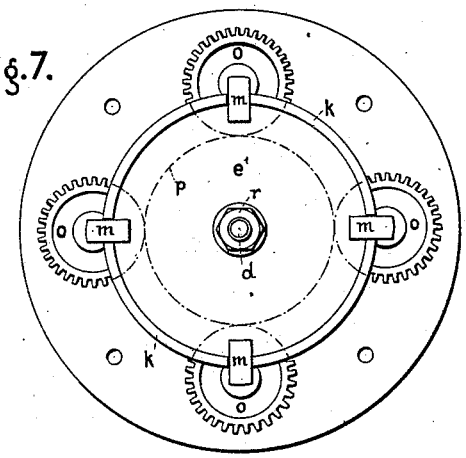

Figure 1 is a front view of the disintegrating-machine; Fig. 2, a plan thereof, and Fig. 3 an end elevation taken from the right-hand side of the machine, as shown in Figs. 1 and 2, while Figs. 4 and 5 represent a part in detail on a larger scale. Fig. 6 shows the compressing apparatus in vertical section; Fig. 7, in plan.

The machine consists, in the first place, of a cylinder, $a$, carrying on its periphery a series of serrated blades, by preference arranged in spiral lines. This cylinder, to which Figs. 4 and 5 relate, is fixed on a shaft, $b$, and it is rotated with considerable speed by a strap passing over the pulley $c$.

$d\ d$ are two shafts, each provided with a disk, $e$, which is or may be permanently fixed, and with a disk, $e'$, so arranged that it can easily be detached; besides, they carry each a driving-pulley, $i$. On these shafts and between the disks $e$ and $e'$ the cylindrical bodies of rags are formed. The bearings of the shafts $d\ d$ are placed on saddles $f$, sliding on the ways $h$, and operated forward or backward, as required, by a screw, $g$.

The machine is provided with two shafts, $d\ d$, in order that one may be removed to receive a new supply of rags, while the other is furnished with material and in operation. There may, however, be but one, or more than two, of these shafts, if preferred.

The compressing apparatus represented by Figs. 6 and 7 consists of the fixed drum $k$, the rods $l$ terminating at the upper end in the hooks $m$, and jointed at the lower end to the screws $n$, engaging with inside threads in the bosses of the pinions $o$, which gear with the wheel $p$, driven by a strap running over the pulley $q$. One of the shafts $d$ of the disintegrating-machine having been placed, together with its fixed disk $e$, into the drum $k$, the latter is filled with rags. The disk $e'$ is placed on the material, and the rods $l$ are turned up, so as to cause the hooks $m$ to project through the slits provided therefor in the drum and to catch over the disk $e'$. The rags having thereupon been compressed to the required degree by the operation of the machine, the disk $e'$ is secured by the nut $r$, the rods $l$ are thrown back, and the shaft $d$, with the cylinder of rags upon it, is drawn or pressed out of the drum. Instead of this apparatus, however, any other suitable press, whether working by screws, knee-levers, hydraulic pressure, or other appliances, may be made use of. Moreover, the drum in which the compression takes place may be divided lengthwise in two or more parts, arranged to be secured together, in order to allow the same to be easily detached from the rag-cylinder.

We claim as our invention—

1. The method of disintegrating rags and other fibrous materials by compressing them into a compact mass, forming a solid of revolution, and thereupon subjecting the same while being rotated to the action of revolving cutters, substantially as and for the purpose specified.

2. In the method of disintegrating rags and other fibrous materials, substantially as described, the process of compressing the material over a shaft and within a cylindrical drum, and securing the same between two disks on the said shaft, as and for the purpose set forth.

3. In a machine for disintegrating rags, the rotating cylinder $a$, provided with serrated cutters, in combination with one or more shafts, $d$, having the disks $e$ and $e'$, and an adjusting mechanism, by which the distance between the cylinder and the shaft or shafts may be increased or decreased during the working, substantially as and for the purpose described.

In testimony whereof we have signed our names to this specification in the presence of two subscribing witnesses.

HARRY FRIEDERICHS.
CHRISTIAN PHILIPPI.

Witnesses as to H. F.:
  B. ROI,
  HY. SPRINGMANN.
As to C. P.:
  WILLIAM C. FOX,
  JOB VERACKE.